Jan. 21, 1936.  R. E. SURTEES  2,028,573
LINER FOR A BRAKE DRUM AND METHOD OF MAKING THE DRUM
Filed Sept. 28, 1932  2 Sheets-Sheet 1
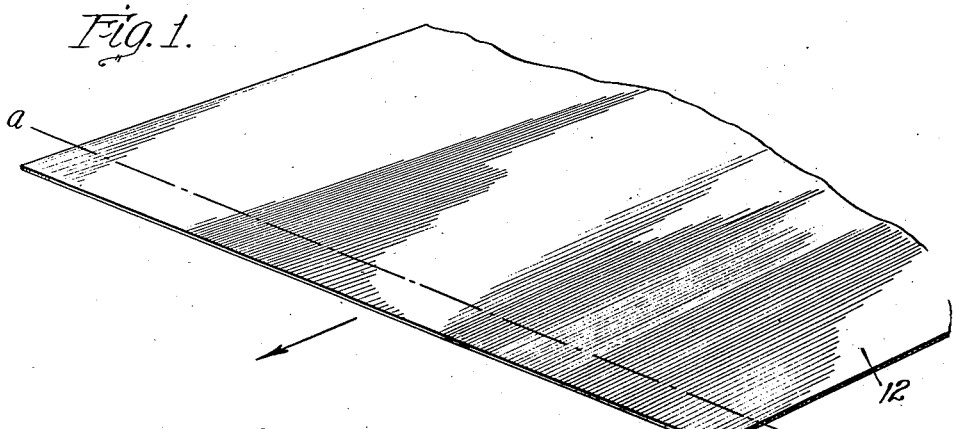
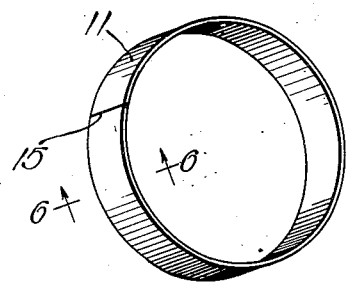
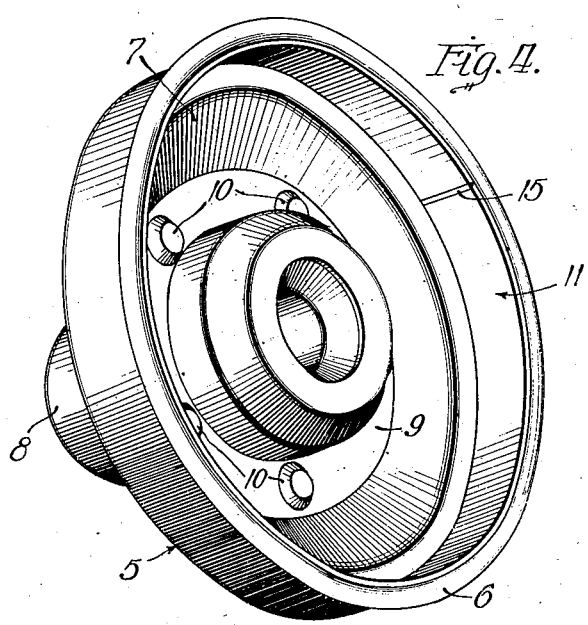
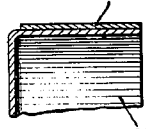
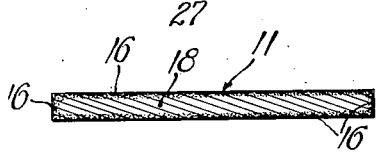
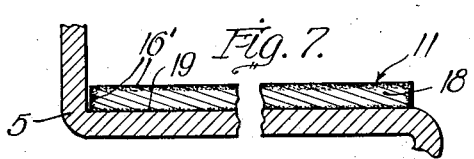
Inventor:
Robert E. Surtees
By: Brown, Jackson, Boettcher + Dienner
Attys.

Jan. 21, 1936. R. E. SURTEES 2,028,573
LINER FOR A BRAKE DRUM AND METHOD OF MAKING THE DRUM
Filed Sept. 28, 1932 2 Sheets-Sheet 2
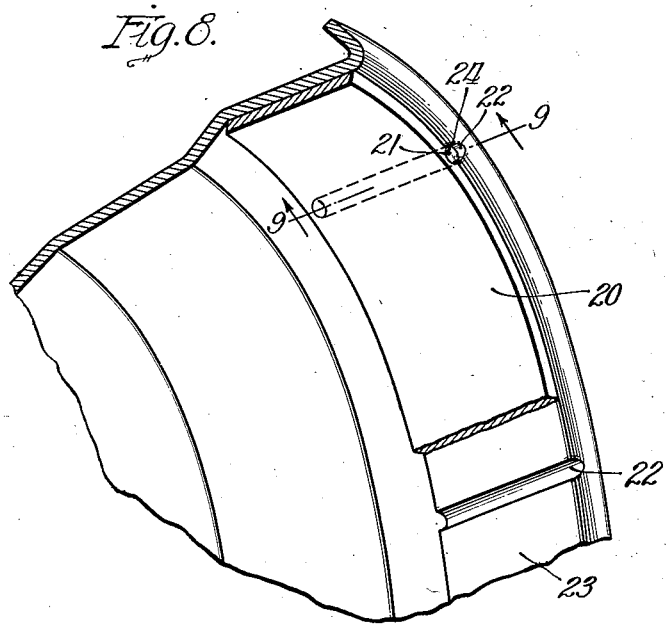
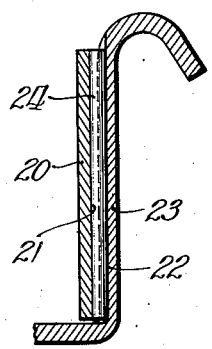
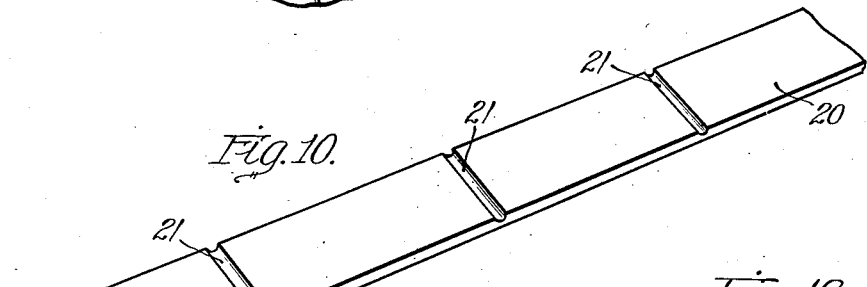
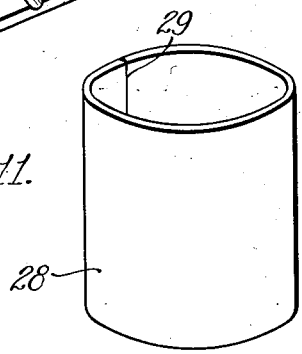
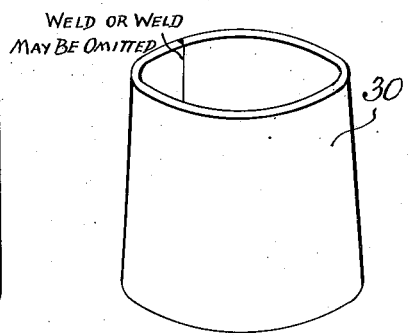

Patented Jan. 21, 1936

2,028,573

UNITED STATES PATENT OFFICE 2,028,573

LINER FOR A BRAKE DRUM AND METHOD OF MAKING THE DRUM

Robert E. Surtees, Riverside, Ill., assignor of one-half to Louis D. Matchette, Milwaukee, Wis.

Application September 28, 1932, Serial No. 635,156

3 Claims. (Cl. 29—152.2)

My invention relates to improvements in automotive structures.

While the particular device which I shall describe hereinafter in connection with the drawings is a brake drum for automotive vehicles, it is to be understood that the present invention is not limited to such use but may be employed for all similar or equivalent purposes.

The brake drum is a very important part of an automobile, truck, bus, and other automotive vehicles. In the earlier vehicles of this sort, with their low speeds, relatively light weight and low efficiency, the brake drums and the braking surfaces thereof were not of such importance. But with the improvement of these vehicles, and their higher speeds, increased weight and greater efficiency, the necessity for better brake drums has become urgent. This is particularly so in the case of the present day trucks and busses, where the brake drums are subjected to severe use. Free-wheeling also results in harder and greater use of these devices.

So far there have been various schemes intended to obtain the desired improvements, but to date manufacturers of brake drums have had to content themselves with the ordinary drum structures or with drums manufactured of alloy steel or coated with a substance which lacks the advantages of the present invention.

Not only has it been difficult to make the drums of the prior art with true braking surfaces, but where the drum has been of a material which corrodes it has been weakened thereby. This corrosion has been accelerated by generated frictional heat and upon continued, or severe use, has caused the frictional surface to distort and lose its initial circular or cylindrical form. Refacing and truing is necessary. This, too, is a problem, and it weakens the drum. After two or three turnings or refacings it has been necessary to discard the drum. In fact, the removal of one-twentieth of an inch from the braking surface of the usual drum will weaken it to such an extent that it will be distorted by the brake shoes.

To avoid some of these disadvantages liners have been previously proposed but such liners have not had the desired properties and have tended to crawl or work loose, particularly under hard usage as, for example, on relatively heavy, high speed busses, or trucks.

With the foregoing problems in mind it is an object of my present invention to provide a brake drum for passenger automobiles, trucks, busses, airplanes, tanks and the like, in which the frictional or braking surface is formed of a nitrided alloy steel or treated in a manner or formed of a material which has the improved properties provided by a nitrided alloy steel.

In the case of an internal expanding brake the nitrided allow steel or equivalent material is preferably in the form of a liner for the internal braking area, whereas in the case of an external contracting brake the nitrided allow steel material is preferably in the form of a covering applied externally over the external braking area of the drum.

It is to be understood that any desired portion of the drum may be surfaced according to the present invention, and instead of employing a liner, or covering, the drum itself or the desired portion thereof may be formed of the desired alloy steel and nitrided within the scope of my present invention.

Where I refer herein, and in the claims, to a nitrided alloy steel surface or member, I intend to include within such expressions not only a nitrided alloy steel surface or member, but any surface or member having the improved properties and peculiar adaptabilities of nitrided alloy steel surfaces or members for the present purposes, as will hereinafter appear.

Where the desired frictional surface is formed by a liner or covering, it is another object of the present invention to provide an improved method of making up and applying the same. This method, in conjunction with a nitrided alloy steel liner or covering, or a liner or covering having the properties of a nitrided alloy steel liner or covering, is applicable in connection with a liner for the cylinders of an internal combustion engine, also for use in bearing sleeves, and possibly for other purposes, and these uses are intended to fall within the scope of my present invention.

Liners according to the present invention for the drums of friction clutches and the like are also contemplated within the scope of the appended claims, and the invention is contemplated for use in connection with stationary, as well as automotive machines.

Now in order to acquaint those skilled in the art with the manner of making and using certain devices in accordance with my invention I shall describe, in connection with the accompanying drawings, certain preferred embodiments of the invention.

In the drawings:

Figure 1 is a fragmentary perspective view showing the flat strip of metal from which the liner is formed;

Figure 2 is a perspective view showing the liner in flat form after being cut to the desired size;

Figure 3 is a perspective view of the liner after it is rolled and shaped to the desired form and before applying the same to the brake drum;

Figure 4 is a perspective view of the brake drum after application of the liner thereto and showing the liner applied to the inner surface of the drum for cooperation with an internal expanding service brake;

Figure 5 is a fragmentary detail section of a brake drum showing a covering embodying the present invention applied externally to form an external braking surface for cooperation with an external contracting emergency brake;

Figure 6 is an enlarged transverse section taken on the line 6—6 of Figure 3 and showing more or less diagrammatically the microstructure of the case of the liner after nitriding the same and before application to the drum;

Figure 7 is an enlarged transverse section taken through a portion of the brake drum of Figure 4 and showing more or less diagrammatically the microstructure of the case of the liner where the same is nitrided after application to the drum;

Figure 8 is a fragmentary perspective view similar to Figure 4, showing a modification in which the liner is additionally keyed to the drum;

Figure 9 is a sectional view taken on the line 9—9 of Figure 8;

Figure 10 is a perspective view of the liner of Figure 8 before rolling the same to circular form;

Figure 11 is a perspective view of a cylinder liner embodying the present invention; and Figure 12 is a view similar to Figure 11, showing a bearing sleeve embodying the present invention.

Referring to the drawings, the drum per se may be the usual or any suitable or preferred brake drum. It may be of the usual ferruginous metal, and has the cylindrical drum part proper indicated at 5. The outer margin of the drum part 5 may be rolled out at 6 and the inner end has the integral end wall 7 suitably shaped and provided axially with a cylindrical hub 8 for the axle shaft. The end wall 7 may have a reinforcing plate 9, and circularly about this plate and extending through the end wall 7 are the wheel-retaining screws 10, by means of which attachment to the wheel is effected.

The liner wall 11 is formed from a flat strip 12, preferably of suitable ferruginous metal. Any suitable metal which can be surface hardened by subjecting it to the action of ammonia gas (nitriding) for a period of two to ninety hours (depending upon the depth of case desired) while the material is heated to within a certain range of temperature, and without quenching, may be employed. The metal preferably employed is a special alloy steel susceptible to nitriding. This material is known in the trade and has been used for other purposes. Suffice it to say that alloy steels containing varying amounts of carbon, together with approximately 1.0% aluminum, 1.0% chromium and 0.2% molybdenum are illustrative of suitable nitriding alloy steels now known.

It is to be understood, however, that any equivalent material or any material treated in an equivalent manner, or having the desired properties, as will hereinafter appear, may be employed within the scope of the present invention.

Alloy steels of the character above referred to provide maximum surface hardness when exposed to ammonia gas under the nitriding process known in the trade. This hardness is retained at high temperatures and these alloys have great resistance to moisture and atmospheric corrosion.

I find that this material is particularly adapted for use as a frictional or braking surface for brake drums, friction clutches and the like. It and the "nitrided" liner, after the nitriding process, is not only particularly adapted for the present purposes but I find lends itself peculiarly well to the method of application to the drum, as will hereinafter appear.

The freedom from corrosion avoids impairment of the strength of the liner by corrosion after use, and it and the "nitriding" process produce freedom from warping and distortion. The acceleration of such distortion by frictional heat generated in a braking surface, particularly in a braking surface for heavy duty and high speed purposes, is avoided, and the tendency to lose it initial circular or cylindrical form after continued use is reduced. Not only is it possible to make the drum with a true braking surface but this surface does not lose its circular or cylindrical form after severe use. There is no appreciable weakening of the braking surface of the drum by corrosion, and the tendency toward distortion of the drum by the brake shoes is also reduced.

The liner 11 is cut off, preferably transversely, from the flat strip 12 along the dot-and-dash line a—a of Figure 1. The width of strip 12 is preferably substantially equal to the circumferential dimension of the rolled liner and the width of the liner is substantially equal to the depth of the internal brake area of the drum 5. After being cut to the desired form and dimensions the flat strip 11 is rolled to true circular form, as shown in Figure 3, and the abutting ends may be welded together at 15. Omission of the weld at 15 is, however, contemplated within the scope of the present invention. The rolling of the liner may be done upon any suitable form or in any suitable or preferred manner, not shown. In forming the strip 12 it is rolled flat in the direction of the arrow in Figure 1 and by cutting the liner 12 transversely of the strip and rolling the same in the manner illustrated, the roll is disposed transversely to the flow of metal, with the result that distortion in the finished liner is further reduced.

The rolled liner 11 may be nitrided before applying it to the drum 5, or it may be applied to the drum 5 first, and nitrided after application to the drum. In either case, in applying the liner the drum is heated to expand the same sufficiently to receive the rolled liner. The liner is then inserted into place, as shown in Figure 4, while the drum is expanded. Upon cooling, the cylindrical wall 5 of the drum shrinks or contracts upon the rolled liner 11 and grips the same rigidly in place against movement relative to the drum.

The nitriding process per se is known in the trade and therefore suffice it to say here that it comprises case-hardening the alloy steel susceptible to nitriding with ammonia gas at low temperatures. Usually the temperatures range from 900° F. to 1100° F. and a temperature of about 950° F. is probably the most common. The alloy steel may be heat treated prior to nitriding, as is also known in the trade. The details of the nitriding equipment and the further details of the nitriding process itself are known and, therefore, need not be repeated here.

Where the rolled liner 11 is nitrided before inserting and securing it in place in the drum 5 the microstructure of the case will be more or less as diagrammatically illustrated in Figure 6. The hardened case illustrated at 16 is of substantially uniform depth about all surfaces of the liner and the hardness of the case decreases gradually until the case merges into the core 18.

Where the rolled liner is inserted and secured in place in the drum 5 before nitriding the liner the microstructure of the case will be more or less as diagrammatically illustrated in Figure 7. In this instance the hardened case 16' will be of greater depth along the inner and end surfaces of the liner and the depth of the case will be less at 19, along the outer surface of the liner, which outer surface engages and is secured to the inner cylindrical surface of the drum 5.

In either event the time and temperature of the nitriding process controls the penetration of the nitrogen and thereby the depth of the nitrided case. This enables making up the liners with nitrided cases of different depths, which may be proportioned to meet different brake pressures and different classes of service of the drum. This proportioning of the depth of the nitrided case in generally direct ratio to the brake pressure to be applied is an aspect of the present invention.

The peculiar applicability of a surface which is formed of an alloy steel susceptible to nitriding or produced by nitriding, or a surface which is produced in a manner or formed of a material providing the properties of a nitrided alloy steel surface as a frictional or braking surface, lies in the fact that the surface contemplated by the present invention will not score, and is non-corrosive after hardening. Tests for hardness show as high as 900 to 1100 Brinell. This surface does not lose its hardness in operation or under the relatively high frictional heats produced by continuous or heavy service braking. It does not lose its braking properties due to corrosion and is hard enough not to be cut by rusted drums and the like.

Another property which makes it peculiarly adapted for this purpose and particularly adapted to the method of surfacing the brake drum by applying the liner and shrinking the drum onto it, is that property which enables the liner to be heated to at least 1100° F. and to be held at that temperature for several hours without affecting its hardness. This permits, without affecting the hardness of the liner, the necessary heating of the drum for the purpose of shrinking it upon the liner.

Another new and, in fact, unexpected result of the use of a liner of this material for the purpose of the present invention, is the provision of a better union between the liner and the drum than heretofore possible. This is particularly advantageous in providing and maintaining a tight attachment of the liner to the drum to prevent the liner from becoming loose or "crawling" under continued or severe use. This has been a problem in connection with liners for relatively heavy and high speed busses and trucks, in which the frictional heat and stresses produced in the braking operation are exceedingly high. With the present invention the liner has a higher coefficient of expansion than the drum, with the result that the frictional heat produced in the braking operation expands the liner an amount in excess of the expansion of the drum to increase the tightness and rigidity of attachment of the liner to the drum under the frictional heat and stresses in the operation of the brakes. In addition, the high coefficient of expansion in the case of the liner gives a good thermal bond to dissipate the frictional heat generated in the operation of the brakes. This further reduces the tendency of the liner to become distorted and the improved union eliminates intervening air pockets between the liner and the drum.

If desired, the liner may be additionally keyed in place as shown in Figures 8 to 10, inclusive. In this case the liner 20 has grooves 21 which are registered with corresponding grooves 22 in the inner periphery of the drum proper 23 upon application of the liner to the drum. Suitable keys 24 are inserted in these registering grooves and additionally key the liner in place and against turning within the drum. Other keying arrangements, and welding of the outer periphery of the liner to the inner periphery of the drum, are also contemplated.

The liner strips of this and the other embodiment preferably come unhardened and are hardened after rolling to form.

In the embodiment of Figure 5 a covering 26 of nitrided alloy steel, or a covering formed in a manner or of a material having the properties of a nitrided alloy steel, is applied externally over the external braking area of the brake drum 27.

Brake drums surfaced in the manner of the present invention are now in use on a number of high speed, heavy duty busses, with success.

In Figure 11, I have shown a generally cylindrical liner 28 for the cylinders of internal combustion engines, which liner 28 is nitrided, or formed of an alloy steel susceptible to nitriding or in a manner or of a material having the properties of nitrided alloy steel. This liner is formed flat and rolled to shape, and its abutting ends may be welded at 29, although omission of the weld is contemplated. As before, the strip from which the liner 28 is formed preferably comes unhardened and the liner is hardened after rolling to form.

In Figure 12, I have shown a bearing sleeve or liner 30 of truncated conical form, which sleeve 30 is formed of the same material and in substantially the same manner as the cylindrical liner of Figure 11.

I have described the invention in connection with the details of certain particular embodiments, but as already pointed out I do not intend thereby to limit the invention to such details, nor do I intend to be limited to the particular embodiments and relations of the essential features shown and described.

I claim:

1. A liner of the class described for brake drums and the like, formed of a flat strip of metal susceptible to nitriding, said strip being rolled to shape transversely of the flow of metal in said strip and nitrided before being inserted in the brake drums.

2. The method of lining a brake drum which consists of nitriding a liner insert by subjecting the insert to action of nitrogen in the presence of heat to form a hardened case of substantially uniform depth, heating the brake drum to expand the same, inserting the nitrided liner after it is cool into the brake drum while the latter is heated, and then cooling the brake drum to cause the same to grip the liner insert and retain the same in position.

3. A liner of the class described for brake drums and the like formed of a flat strip of metal susceptible to nitriding, said strip being rolled to shape and nitrided before being inserted in the brake drum.

ROBERT E. SURTEES.